United States Patent
Yoon et al.

(10) Patent No.: US 11,110,401 B2
(45) Date of Patent: Sep. 7, 2021

(54) METHOD FOR HYDROPHILIZING POROUS MEMBRANE AND METHOD FOR MANUFACTURING ION-EXCHANGE MEMBRANE USING SAME

(71) Applicants: W-SCOPE KOREA CO., LTD., Cheongju-si (KR); W-SCOPE CHUNGJU PLANT CO., LTD., Chungju-si (KR)

(72) Inventors: Kyung Seok Yoon, Cheongju-si (KR); Byung Hyun Kim, Cheongju-si (KR); Won Sun Ryoo, Seoul (KR); Myung Su Jung, Daejeon (KR); Bom Yi Lee, Pyeongtaek-si (KR)

(73) Assignees: W-SCOPE KOREA CO., LTD., Chenongju-si (KR); W-SCOPE CHUNGJU PLANT CO., LTD., Chungju-si (KR)

(*) Notice: Subject to any disclaimer, the term of this patent is extended or adjusted under 35 U.S.C. 154(b) by 0 days.

(21) Appl. No.: 16/599,391

(22) Filed: Oct. 11, 2019

(65) Prior Publication Data
US 2020/0038813 A1 Feb. 6, 2020

Related U.S. Application Data

(63) Continuation of application No. PCT/KR2018/004306, filed on Apr. 12, 2018.

(30) Foreign Application Priority Data

Apr. 13, 2017 (KR) .................. 10-2017-0047703

(51) Int. Cl.
*B01D 67/00* (2006.01)
*B01D 71/26* (2006.01)
(Continued)

(52) U.S. Cl.
CPC .......... *B01D 67/009* (2013.01); *B01D 71/26* (2013.01); *B01D 71/82* (2013.01);
(Continued)

(58) Field of Classification Search
USPC ..................................... 521/27, 33
See application file for complete search history.

(56) References Cited

U.S. PATENT DOCUMENTS 4,409,339 A * 10/1983 Matsuda .............. B01D 67/003
521/143
6,602,324 B2 8/2003 Stein et al.
(Continued)

FOREIGN PATENT DOCUMENTS

EP 3 124 101 A1 2/2017
KR 10-2009-0008315 A 1/2009
(Continued)

OTHER PUBLICATIONS

International Search Report issued in PCT/KR2018/004306; dated Aug. 21, 2018.
(Continued)

*Primary Examiner* — Fred M Teskin
(74) *Attorney, Agent, or Firm* — Studebaker & Brackett PC

(57) ABSTRACT

In one exemplary embodiment of the present invention, there are provided a method of hydrophilizing a porous membrane which includes treating a porous membrane with plasma in the presence of a mixed gas containing sulfur dioxide ($SO_2$) and oxygen ($O_2$), and a method of preparing an ion-exchange membrane using the same.

14 Claims, 3 Drawing Sheets

(51) Int. Cl.
  *B01D 71/82* (2006.01)
  *C08J 5/22* (2006.01)
(52) U.S. Cl.
  CPC ...... *B01D 2323/02* (2013.01); *B01D 2323/21* (2013.01); *B01D 2325/02* (2013.01); *B01D 2325/42* (2013.01)

(56) References Cited

U.S. PATENT DOCUMENTS

2005/0164009 A1* 7/2005 Rieke .................. B01J 19/30
                                                 428/421
2017/0028358 A1* 2/2017 Singh .................. B01D 67/009

FOREIGN PATENT DOCUMENTS

| KR | 10-2016-0088971 A | 7/2016 | |
|---|---|---|---|
| KR | 10-2017-0015140 A | 2/2017 | |
| KR | 10-2019-0141865 A | 12/2019 | |
| WO | 02/29879 A1 | 4/2002 | |
| WO | WO 2007/126967 A2 * | 11/2007 | ............. B32B 15/02 |
| WO | 2007/126967 A3 | 12/2009 | |

OTHER PUBLICATIONS

Office Action issued in KR 10-2017-0047703; mailed by the Korean Intellectual Property Office dated Mar. 14, 2018.

* cited by examiner

METHOD FOR HYDROPHILIZING POROUS MEMBRANE AND METHOD FOR MANUFACTURING ION-EXCHANGE MEMBRANE USING SAME

CROSS-REFERENCE TO RELATED APPLICATIONS

The present application is a continuation of International Patent Application No. PCT/KR2018/004306, filed on Apr. 12, 2018, which is based upon and claims the benefit of priority to Korean Patent Application No. 10-2017-0047703, filed on Apr. 13, 2017. The disclosures of the above-listed applications are hereby incorporated by reference herein in their entirety.

TECHNICAL FIELD

The present invention relates to a method of hydrophilizing a porous membrane and a method of preparing an ion-exchange membrane using the same.

BACKGROUND ART

An ion-exchange membrane has been utilized in a variety of fields such as fuel cells, redox flow batteries, water treatment, seawater desalination, and the like. The ion-exchange membrane has entered the global spotlight, especially, as a major clean technology that can reduce environmental pollution by decreasing the usage amount of fossil fuel because of its relatively simple preparation process, high selectivity for specific ions, and wide application area. Since the ion-exchange membrane is capable of selectively separating cations and anions in an aqueous solution, it has been widely used in fuel cells, electrodialysis, water-splitting electrodialysis for recovering acids and bases, diffusion dialysis for recovering acids and metallic chemical species from the waste liquor in pickling, ultrapure water treatment, and the like, and as a high-performance ion-exchange membrane has recently been developed in advanced countries, the application area of the ion-exchange membrane is further expanding.

Such an ion-exchange membrane needs to have high selectivity, low permeability of a solvent and a non-ionic solute, low resistance to diffusion of a selected permeable ion, high mechanical strength, and high chemical resistance. In addition, the ion-exchange membrane requires excellent mechanical strength and high durability. As methods commonly used to meet these demands, there are a method of preparing a hybrid composite membrane by adding inorganic material, a hot pressing method of thermally compressing a catalyst mixture, a method of adding a curing agent, and the like. The method of preparing a hybrid composite membrane has a disadvantage in that, if the swelling phenomenon of the membrane continues to occur, the membrane cannot exhibit normal ion exchange capacity due to a gap generated between the additive of the membrane and the polymer membrane. In addition, the method of adding a curing agent has a disadvantage in that a curing agent is eluted over time. Due to the problems described above, there is still a demand for the development of an ion-exchange membrane with high durability and excellent mechanical properties.

Examples of currently commercially available ion-exchange membranes include sulfonated polystyrene, Nafion™ (hereinafter, simply referred to as "Nafion") manufactured by Du Pont, and the like. However, the sulfonated polystyrene is broken due to increased brittleness when dried, making it difficult to form a thin membrane, a composite membrane, or the like, and it exhibits degraded mechanical stability when processed to manufacture an electrode. In order to solve these problems, there is a method of adjusting the sulfonation ratio of polystyrene or thickening the membrane, but this method causes an increase in resistance of the membrane, which significantly degrades the ion exchange capacity of the membrane, so that it cannot be expected to function as an ion-exchange membrane, and also causes an increase in volume during manufacture of the system, so that it has spatial constraints. In addition, although Nafion which is a fluorine-based material has been widely used as an ion-exchange membrane due to its high ion conductivity, high chemical stability, and the like, Nafion is very expensive because it is a fluorine compound, and the use thereof at high temperature is limited. Indeed, the expensive ion-exchange membranes such as Nafion and the like have been pointed out as a cause for elevating the manufacturing costs of a stack. The fluorine-based ion-exchange membrane such as Nafion has a high unit cost of about 1 million won/$m^2$, which is one of the problems to be solved. Therefore, research has been widely conducted on a non-fluorine-based ion-exchange membrane with low cost, especially, on hydrocarbon-based polymers such as sulfonated poly(arylene ether sulfone) (SPAES), sulfonated poly(ether ether ketone) (SPEEK), polybenzimidazole (PBI), sulfonated polysulfone (SPSf), and other synthetic polymers.

As described above, new materials have been developed and tested for their potential by controlling a variety of factors in the non-fluorine-based polymer, such as the introduction of various functional groups, the placement of polymer chains, the adjustment of molecular weight, and the like. However, most of the materials have limited practical application due to low chemical and physical stability despite having excellent electrical performance.

Accordingly, although various methods have been proposed to enhance the inherent performance of the polymer material, there are still problems of low ion selectivity and low durability.

Technical Problem

The present invention has been designed to solve the above-described problems of the prior art, and is directed to providing a method of hydrophilizing a porous substrate membrane and a method of preparing an ion-exchange membrane using the same, which are capable of preparing an ion-exchange membrane that is highly economical due to low manufacturing costs while being excellent in durability and ion exchange capacity.

Technical Solution

In one aspect of the present invention, there is provided a method of hydrophilizing a porous membrane which includes treating a porous membrane with plasma in the presence of a mixed gas containing sulfur dioxide ($SO_2$) and oxygen ($O_2$).

According to one exemplary embodiment, the mixed gas may include sulfur dioxide at 50 to 90 vol % and oxygen at 10 to 50 vol %.

According to one exemplary embodiment, the porous membrane may include two types of polyethylene having different weight-average molecular weights at 30 to 90 wt % and an inorganic filler at 10 to 70 wt %.

According to one exemplary embodiment, the polyethylene may include a first polyethylene having a weight-average molecular weight of 1,000,000 to 3,000,000 g/mol and a second polyethylene having a weight-average molecular weight of 200,000 to 500,000 g/mol.

According to one exemplary embodiment, the inorganic filler may have an average particle size of 10 to 1,000 nm.

According to one exemplary embodiment, the inorganic filler may include a hydrocarbon layer formed on a surface thereof.

According to one exemplary embodiment, the porous membrane may have an average pore size of 20 to 2,000 nm.

According to one exemplary embodiment, the plasma treatment may be carried out for 0.5 to 20 minutes.

In another aspect of the present invention, there is provided a porous membrane hydrophilized by the above-described method.

According to one exemplary embodiment, the porous membrane may have a contact angle of 15° or less.

According to one exemplary embodiment, the porous membrane may have a porosity of 50 to 80 vol %.

In still another aspect of the present invention, there is provided a method of preparing an ion-exchange membrane, which includes: (a) hydrophilizing a porous membrane by treating the porous membrane with plasma in the presence of a mixed gas containing sulfur dioxide ($SO_2$) and oxygen ($O_2$); (b) preparing an electrolytic solution by dissolving a polymer electrolyte in a solvent; and (c) impregnating the porous membrane hydrophilized in the step (a) with the electrolytic solution.

According to one exemplary embodiment, the polymer electrolyte may be a sulfonated polymer.

According to one exemplary embodiment, the sulfonated polymer may be one sulfonated hydrocarbon-based polymer selected from the group consisting of sulfonated polysulfones, sulfonated polyethersulfones, sulfonated polythiosulfones, sulfonated polyether ether ketones, sulfonated polyimides, sulfonated polystyrenes, sulfonated polyphosphazenes, and a mixture of two or more thereof.

According to one exemplary embodiment, the sulfonated polymer may have a degree of sulfonation of 60 to 90%.

According to one exemplary embodiment, the electrolytic solution may include the polymer electrolyte at 30 to 60 wt %.

According to one exemplary embodiment, the solvent may be one selected from the group consisting of an ester-based solvent, an ether-based solvent, an alcohol-based solvent, a ketone-based solvent, an amide-based solvent, a sulfone-based solvent, a carbonate-based solvent, an aliphatic hydrocarbon-based solvent, an aromatic hydrocarbon-based solvent, and a mixture of two or more thereof.

Advantageous Effects

According to one aspect of the present invention, the surface and inner pore surface of a porous membrane, which acts as the support of an ion-exchange membrane, are hydrophilized and sulfonated by treating the porous membrane with plasma in the presence of a mixed gas containing sulfur dioxide ($SO_2$) and oxygen ($O_2$), so that the binding affinity of the porous membrane with a polymer electrolyte impregnated therein can be enhanced and accordingly the durability and ion conductivity of the ion-exchange membrane can be enhanced.

In addition, a sulfonated polymer is used as the polymer electrolyte, so that unlike the related art, the durability and ion conductivity of an ion-exchange membrane can be harmoniously realized.

However, it is to be understood that the effects of the present invention are not limited to the above-described effects but include all effects deducible from the configuration of the invention described in the detailed description of the invention or in the claims.

DETAILED DESCRIPTION

Figure 1:
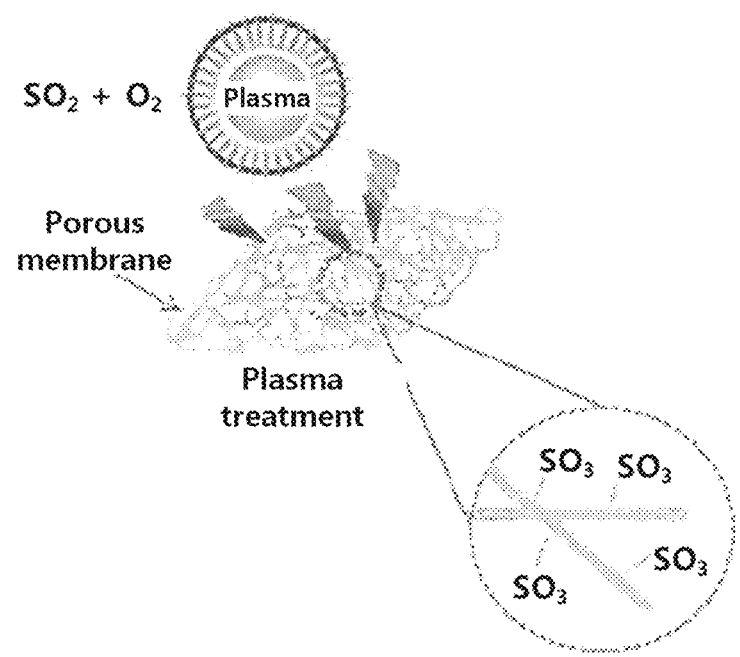
FIG. 1 is a schematic diagram of a method of hydrophilizing a porous membrane according to one aspect of the present invention.

Hereinafter, exemplary embodiments of the present invention will be described in detail with reference to accompanying drawings. However, it should be understood that the present invention can be implemented in various forms, and that it is not intended to limit the present invention to the exemplary embodiments. Also, in the drawings, descriptions of parts unrelated to the detailed description are omitted to clearly describe the present invention. Throughout the specification, like numbers refer to like elements.

Throughout this specification, when a part is mentioned as being "connected" to another part, this means that the part may not only be "directly connected" to the other part but may also be "indirectly connected" to the other part through another member interposed therebetween. In addition, when a part is mentioned as "including" a specific component, this does not preclude the possibility of the presence of other component(s) in the part which means that the part may further include the other component(s), unless otherwise stated.

Method of Hydrophilizing Porous Membrane and Porous Membrane Hydrophilized Thereby FIG. 1 is a schematic diagram of a method of hydrophilizing a porous membrane according to one aspect of the present invention. Referring to FIG. 1, a method of hydrophilizing a porous membrane according to one aspect of the present invention may include treating a porous membrane with plasma in the presence of a mixed gas containing sulfur dioxide ($SO_2$) and oxygen ($O_2$).

The plasma treatment is carried out to hydrophilize the surface and inner pore surface of the porous membrane which acts as a support in the preparation of an ion-exchange membrane to be described below, that is, allowing the surface and inner pore surface of the porous membrane to become negatively charged, so that the binding affinity of the porous membrane with a polymer electrolyte can be enhanced, and accordingly, the durability (especially, long-term durability) and ion conductivity of an ion-exchange membrane can be significantly enhanced.

Conventionally, a wet process in which a porous membrane is sulfonated by immersing the same in sulfuric acid or the like for a predetermined time has been mainly used to hydrophilize the surface of the porous membrane and realize a predetermined level of ion conductivity. However, since the wet process is carried out separately from the plasma treatment, that is, carried out before or after the plasma treatment, the process is complicated, and a large amount of waste liquid is generated during the process.

On the other hand, since the process gas used in the plasma treatment of the present invention includes a predetermined amount of sulfur dioxide gas as well as air, oxygen, and/or an inert gas which are/is conventionally included, it is possible to form a functional group such as —$SO_3$ on the surface and inner pore surface of the porous membrane, that is, to sulfonate the surface and inner pore surface by a single dry process, i.e., the plasma treatment, without carrying out the wet process in which the porous membrane is immersed in sulfuric acid or the like, and therefore, the hydrophilicity and ion conductivity of the porous membrane can be maximized, a conventional complicated process can be simplified, and it can be advantageous in terms of the environment.

The mixed gas which is a process gas used in the plasma treatment may include sulfur dioxide at 50 to 90 vol % and oxygen at 10 to 50 vol %, preferably sulfur dioxide at 60 to 80 vol % and oxygen at 20 to 40 vol %, and more preferably sulfur dioxide at 70 to 80 vol % and oxygen at 20 to 30 vol %. When the content of sulfur dioxide in the mixed gas is less than 50 vol %, a required level of hydrophilicity may not be imparted to the porous membrane, and when the content of sulfur dioxide in the mixed gas is greater than 90 vol %, the process may become unstable.

The plasma treatment may be carried out for 0.5 to 20 minutes. When the plasma treatment is carried out for less than 0.5 minute, the porous membrane may not be hydrophilized and sulfonated at a required level, and when the plasma treatment is carried out for greater than 20 minutes, a degree of hydrophilization and a degree of sulfonation converge to a predetermined level, and thus processing efficiency may be degraded.

The porous membrane hydrophilized by the method may have an average pore size of 20 to 2,000 nm and a contact angle of 15° or less, and an absolute value of zeta potential, which is measured as a negative value (−) on the surface of the porous membrane, may be 10 mV or more, preferably 15 mV or more, and more preferably 20 mV or more. In addition, the porous membrane may have a porosity of 50 to 80 vol %.

The porous membrane may include two types of polyethylene having different weight-average molecular weights at 30 to 90 wt % and an inorganic filler at 10 to 70 wt %. The polyethylene may include a first polyethylene having a weight-average molecular weight of 1,000,000 to 3,000,000 g/mol and a molecular weight distribution index of 3 to 4 and a second polyethylene having a weight-average molecular weight of 200,000 to 500,000 g/mol and a molecular weight distribution index of 4 to 7. For example, the polyethylene may include the first polyethylene at 30 to 70 wt % and the second polyethylene at 30 to 70 wt %. The weight-average molecular weight is a value converted relative to a polystyrene standard measured using gel permeation chromatography (GPC).

In general, as the molecular weight distribution (Mw/Mn) becomes wider, shear stress is decreased, which causes viscosity to be lowered, and thus processability is enhanced, whereas physical properties are degraded. On the other hand, as the molecular weight distribution becomes narrower, processability is degraded, whereas physical properties are enhanced. Accordingly, although at least two types of polymer materials are kneaded and thus used in the form of a composition, when the polymer materials have similar molecular weight distributions, physical properties and processability may not be harmoniously realized. Therefore, when the first and second polyethylene having different weight-average molecular weights and different molecular weight distributions are used together as described above, the physical properties and processability of the porous membrane can be more harmoniously realized.

The inorganic filler may be one selected from the group consisting of silica ($SiO_2$), $TiO_2$, $Al_2O_3$, zeolite, AlOOH, $BaTiO_2$, talc, $Al(OH)_3$, $CaCO_3$, and a mixture of two or more thereof, and is preferably a spherical nanoparticle having an average particle size of 10 nm to 1,000 nm, more preferably, a nanoparticle whose surface is hydrophobized or hydrophilized. The porous membrane may include the inorganic filler at 10 to 70 wt %, preferably, 10 to 60 wt %. When the content of the inorganic filler is less than 10 wt %, the mechanical strength, acid resistance, chemical resistance, and flame retardancy of the porous membrane may be degraded, and when the content of the inorganic filler is greater than 70 wt %, the flexibility and processability of the porous membrane may be degraded.

For example, silica ($SiO_2$) may include a hydrocarbon layer formed thereon, wherein the hydrocarbon layer consists of a linear hydrocarbon molecule having hydrophobicity. Since the silica itself has hydrophilicity, a spherical silica nanoparticle coated with a linear hydrocarbon molecule, for example, polyethylene, is suitable for improving compatibility thereof with polyethylene having hydrophobicity.

Method of Preparing Ion-Exchange Membrane

Figure 2:
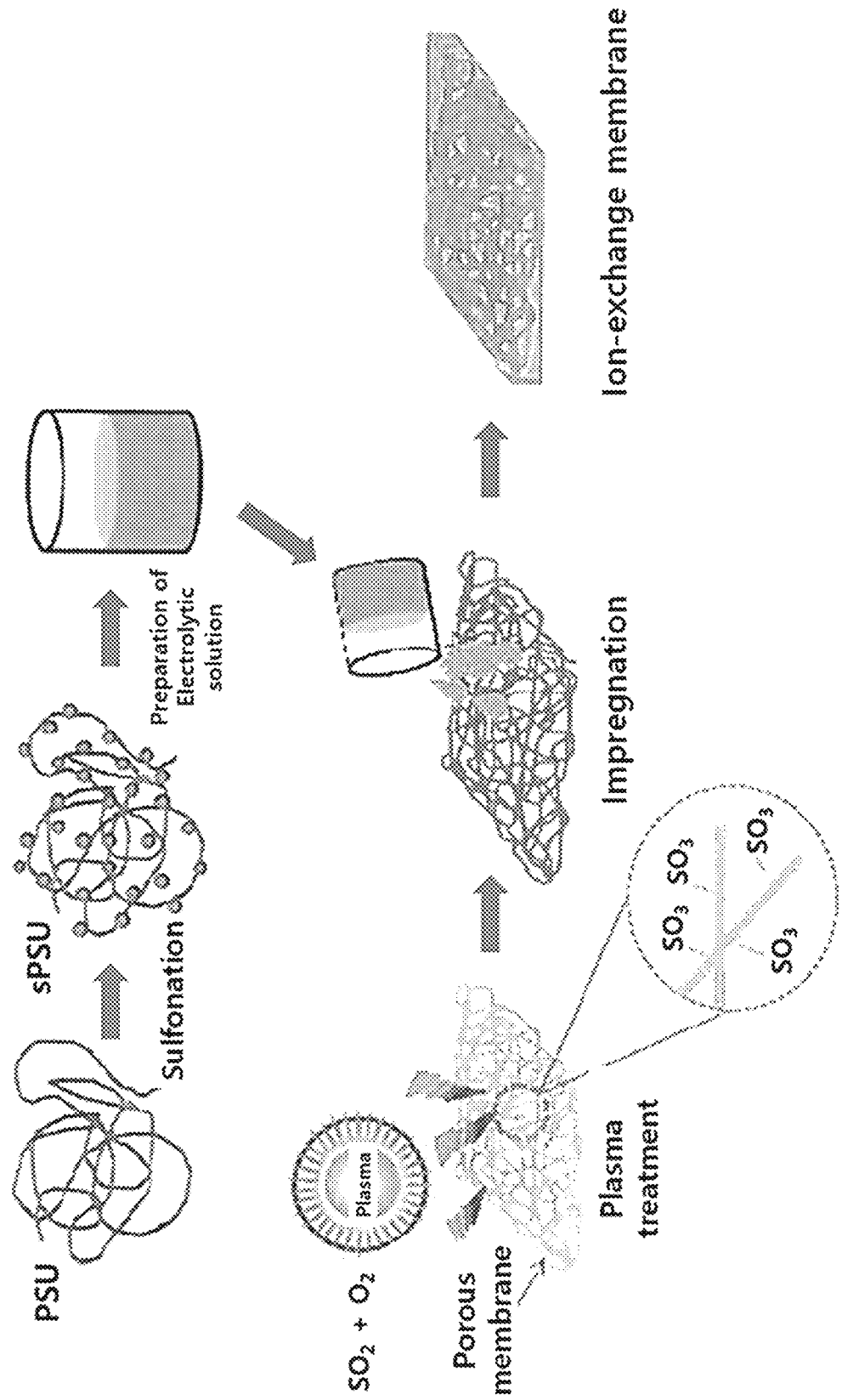
FIG. 2 is a schematic diagram of a method of preparing an ion-exchange membrane according to another aspect of the present invention.

FIG. 2 is a schematic diagram of a method of preparing an ion-exchange membrane according to another aspect of the present invention. Referring to FIG. 2, a method of preparing an ion-exchange membrane according to another aspect of the present invention includes: (a) hydrophilizing a porous membrane by treating the porous membrane with plasma in the presence of a mixed gas containing sulfur dioxide ($SO_2$) and oxygen ($O_2$); (b) preparing an electrolytic solution by dissolving a polymer electrolyte in a solvent; and (c) impregnating the porous membrane hydrophilized in the step (a) with the electrolytic solution.

In the step (a), a porous membrane may be hydrophilized by treating the porous membrane with plasma in the presence of a mixed gas containing sulfur dioxide ($SO_2$) and oxygen ($O_2$). Since the step (a) corresponds to the above-described method of hydrophilizing a porous membrane, descriptions of a mixed gas, plasma treatment, hydrophilization, and the like used herein are the same as described above.

In the step (b), an electrolytic solution may be prepared by dissolving a polymer electrolyte in a solvent. The polymer electrolyte may be a sulfonated polymer. For example, the sulfonated polymer may be one sulfonated hydrocarbon-based polymer selected from the group consisting of sulfonated polysulfones, sulfonated polyethersulfones, sulfonated polythiosulfones, sulfonated polyether ether ketones, sulfonated polyimides, sulfonated polystyrenes, sulfonated polyphosphazenes, and a mixture of two or more thereof., and is preferably sulfonated polysulfone, but the present invention is not limited thereto.

The sulfonated polymer may have a degree of sulfonation of 60 to 90%. As used herein, the term "degree of sulfonation" may be calculated by the equation n/m, wherein m is the total number of moles of the plurality of monomers constituting the sulfonated polymer, and n is the number of moles of monomers substituted with one or more sulfonate groups in the sulfonated polymer. For example, when n/m is 1, the degree of sulfonation may be 100%.

In general, as the degree of sulfonation of the polymer electrolyte is higher, the ion conductivity of the polymer is increased, whereas dissolution in water or severe swelling is caused due to an excessive increase in hydrophilicity. On the other hand, as the degree of sulfonation of the polymer electrolyte is lower, water resistance and durability are enhanced due to high hydrophobicity, whereas ion conductivity is degraded. Therefore, the degree of sulfonation of the polymer electrolyte may be adjusted within the range of 60 to 90% to harmoniously realize ion conductivity, water resistance, and durability.

The electrolytic solution may include the polymer electrolyte at 30 to 60 wt %. When the content of the polymer electrolyte is less than 30 wt %, the ion conductivity of an ion-exchange membrane may be degraded, on the other hand, when the content of the polymer electrolyte is greater than 60 wt %, the water resistance and durability of an ion-exchange membrane may be degraded.

The solvent may be one selected from the group consisting of an ester-based solvent, an ether-based solvent, an alcohol-based solvent, a ketone-based solvent, an amide-based solvent, a sulfone-based solvent, a carbonate-based solvent, an aliphatic hydrocarbon-based solvent, an aromatic hydrocarbon-based solvent, and a mixture of two or more thereof, and is preferably an amide-based solvent and more preferably N-methyl-2-pyrrolidone.

The ester-based solvent may be methyl acetate, ethyl acetate, n-butyl acetate, cellosolve acetate, propylene glycol monomethyl acetate, 3-methoxybutyl acetate, methyl butyrate, ethyl butyrate, propyl propionate, or the like, but the present invention is not limited thereto.

The ether-based solvent may be diethyl ether, dipropyl ether, dibutyl ether, butyl ethyl ether, tetrahydrofuran, ethylene glycol monomethyl ether, ethylene glycol monoethyl ether, ethylene glycol monobutyl ether, octyl ether, hexyl ether, or the like, but the present invention is not limited thereto.

The alcohol-based solvent may be methanol, ethanol, propanol, isopropanol, n-butanol, amyl alcohol, cyclohexanol, octyl alcohol, decanol, or the like, but the present invention is not limited thereto.

The ketone-based solvent may be acetone, cyclohexanone, methyl amyl ketone, diisobutyl ketone, methyl ethyl ketone, methyl isobutyl ketone, or the like, but the present invention is not limited thereto.

The amide-based solvent may be N-methyl-2-pyrrolidone, 2-pyrrolidone, N-methylformamide, dimethylformamide, dimethylacetamide, or the like, but the present invention is not limited thereto.

The sulfone-based solvent may be dimethyl sulfoxide, diethyl sulfoxide, diethyl sulfone, tetramethylene sulfone, or the like, but the present invention is not limited thereto.

The carbonate-based solvent may be ethylene carbonate, dimethyl carbonate, diethyl carbonate, methyl ethyl carbonate, propylene carbonate, ethylene carbonate, dibutyl carbonate, or the like, but the present invention is not limited thereto.

The aliphatic hydrocarbon-based solvent may be pentane, hexane, heptane, octane, nonane, decane, dodecane, tetradecane, hexadecane, or the like, and the aromatic hydrocarbon-based solvent may be benzene, ethylbenzene, chlorobenzene, toluene, xylene, or the like, but the present invention is not limited thereto.

In the step (c), the porous membrane hydrophilized in the step (a) may be impregnated with the electrolytic solution to fill the pores of the porous membrane with the polymer electrolyte. If necessary, the polymer electrolyte may also be coated to a predetermined thickness on the surface of the porous membrane. The porous membrane may have a thickness of 10 to 100 μm, and an ion-exchange membrane having been filled and/or coated with the polymer electrolyte according to the step (c) may have a thickness of 30 to 200 μm.

As described above, since the —$SO_3$ group formed on the surface and inner pore surface of the hydrophilized porous membrane has hydrophilicity, the porous membrane may exhibit high affinity with the polymer electrolyte intrinsically having hydrophilicity, and since the porous membrane may easily bind to the polymer electrolyte, binding affinity may also be reinforced. As a result, the durability of the ion-exchange membrane may be significantly enhanced, and the ion conductivity thereof may also be enhanced due to minimized loss of hydrophilic groups included in the porous membrane and the polymer electrolyte.

Hereinafter, exemplary embodiments of the present invention will be described in detail.

Preparation Example 1: Preparation and Hydrophilization of Porous Support 20 parts by weight of nanosilica particles having an average particle size of 600 nm, whose surface had been coated with ethylene, 65 parts by weight of liquid paraffin oil having a kinematic viscosity of 40 cSt (at 40° C.), 20 parts by weight of a first polyethylene having a weight-average molecular weight of 1,500,000 g/mol, and 20 parts by weight of a second polyethylene having a weight-average molecular weight of 350,000 g/mol were mixed using a high-speed mixer to disperse the nanosilica particles.

Afterward, microbubbles generated in the mixing process were eliminated by vacuum deaeration, and the resultant substance was melt-kneaded and extruded at 190 to 230° C. using a twin-screw extruder equipped with a T-die with a width of 350 mm. In this case, the input amount was adjusted such that a porous support includes the nanosilica at 51.4 wt %. The melt-kneaded substance thus extruded through the T-die was cooled to room temperature and solidified while passing over a casting roller set at 60° C., and the thickness of a sheet was adjusted to 1 to 2 mm.

Subsequently, the extruded porous support was stretched 100% in each of transverse and longitudinal directions using a biaxial stretching machine heated to 120° C. to prepare a film. The stretched film was immersed in 40° C. methylene chloride for 1 hour to eliminate the liquid paraffin oil and then dried at room temperature to eliminate a residual solvent. Afterward, the resultant film was stretched 10% and then shrunk 5% in each of transverse and longitudinal directions using a biaxial stretching machine, and heat-set while maintaining the state of the film for 30 seconds, thereby preparing a porous support having an average pore size of 150 nm.

The porous support was treated with plasma in a vacuum to modify the surface thereof. Before treatment with plasma, the porous support was placed in a case capable of keeping the support flattened and then purged with nitrogen to remove impurities on the support.

An apparatus for the vacuum-plasma treatment included a chamber having a width, depth, and height of 150 mm, 200 mm, and 120 mm, respectively, and a planar electrode configured to create plasma and placed in parallel at a position 25 mm away from the top of the chamber. The porous support was placed in parallel at a position 20 mm away from the planar electrode, and a vacuum condition was established until the pressure inside the chamber was 0.1 Torr.

The inside of the chamber was purged with a gas having a composition shown in Table 1 below for 2 minutes while flowing the gas into the chamber at a flow rate of 100 SCCM and maintaining the pressure inside the chamber at 0.5 Torr. In addition, the porous support was treated by applying a high-frequency power source having a frequency of 50 kHz at an output of 100 W for a time shown in Table 1 below. After the treatment, the flow of gas into the chamber was blocked, the inside of the chamber was purged with air for 2 minutes while maintaining the pressure inside the chamber at 0.5 Torr, and the vacuum condition was relieved to open the chamber.

The porous support was turned upside down and then placed in the chamber in the same manner as described above, and the above-described process was repeatedly performed to allow both surfaces, that is, the upper surface and lower surface, of the porous support to be uniformly treated.

A contact angle between the surface of the surface-treated porous support and a drop of double distilled water was measured to evaluate a change in hydrophilicity of the porous support, and the zeta potential of the surface of the porous support was measured using a flow potential method to evaluate charge characteristics of the porous support. Measurement and evaluation results are shown in Table 1 below.

torily immersed in water because water penetrated into pores, and appeared transparent because the difference in refractive index between water filling the pores and the polyethylene material was relieved.

In addition, it can be seen through Examples 1 and 2 that the surface of the porous support is more effectively hydrophilically modified when the content of sulfur dioxide in the process gas is higher than oxygen.

Preparation Example 2: Preparation of Sulfonated Polysulfone 354.4 g (0.8 mol) of polysulfone and 3,900 ml of dichloroethane were added to a 5 L 5-neck reaction vessel equipped with a mechanical agitator, a gas inlet, and a cooler, and stirred under a nitrogen atmosphere at room temperature for at least 12 hours.

After the dissolution was completed, 259.3 ml (2 mol) of chlorotrimethylsilane and a mixture of 134.4 ml (2 mol) of chlorosulfonic acid and 100 ml of dichloromethane were sequentially and slowly added using a dropping funnel. After the addition was completed, a reaction was carried out for 6 hours.

After the reaction was terminated, the reaction product was precipitated by being slowly poured into methanol, then washed 2 to 3 times to eliminate residual dichloroethane, and placed in an aqueous NaCl solution to convert the product into a $Na^+$ ion in the form of a salt, followed by pulverization and washing.

TABLE 1

| Classification | Example 1 | Example 2 | Example 3 | Example 4 | Example 5 | Comparative Example 1 | Comparative Example 2 |
|---|---|---|---|---|---|---|---|
| Gas composition ($O_2:SO_2$, vol %) | 50:50 | 20:80 | 20:80 | 20:80 | 20:80 | — | Air |
| Plasma treatment duration (sec) | 120 | 120 | 90 | 60 | 30 | — | 120 |
| Contact angle (degree, °) | 2 | 0 | 0 | 3 | 11 | 105 | 92 |
| Zeta potential (mV) | −10 | −25 | −23 | −18 | −12 | 0 | −2 |

Referring to Table 1, the porous support (Comparative Example 1), whose surface was not treated with plasma, exhibited high hydrophobicity, and the surface thereof was not electrically charged at all, whereas the porous supports (Examples 1 to 5), whose surfaces were treated with plasma using, as a process gas, a mixed gas containing oxygen and sulfur dioxide in a specific ratio, exhibited significantly increased hydrophilicity, and the surfaces thereof were negatively charged.

Figure 3:
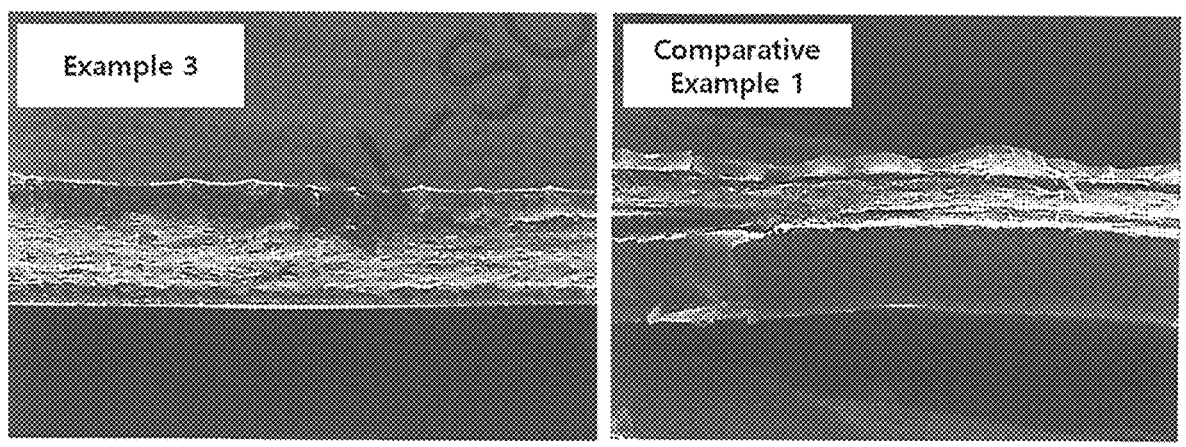
FIG. 3 is a scanning electron microscope (SEM) image of the cross section of the porous membranes according to an example of the present invention and a comparative example.

Referring to FIG. 3, when the polyethylene porous substrate membrane of Comparative Example 1 whose surface was not treated with plasma and the porous substrate membrane of Example 1 whose surface was treated with plasma were immersed in distilled water, the porous substrate membrane of Comparative Example 1 floated on water due to the features of water not penetrating into pores and the surface in contact with air, and appeared opaque due to light scattering caused by the difference in refractive index between the pores and the polyethylene material, whereas the porous substrate membrane of Example 1 was satisfac- The resultant product was neutralized with an aqueous 10 N NaOH solution using a mechanical agitator, then washed with water, filtered, and dried under reduced pressure in a 80° C. vacuum oven for at least 24 hours, thereby obtaining sulfonated polysulfone having a degree of sulfonation of 80%.

Preparation Example 3: Preparation of Ion-Exchange Membrane

The sulfonated polysulfone of Preparation Example 2 was dissolved in NMP at a concentration of 30 to 60 wt % at 60° C. for 2 hours to prepare an electrolytic solution, and each of the porous supports of Examples 1 to 5 and Comparative Examples 1 and 2 was impregnated with the electrolytic solution, thereby preparing an ion-exchange membrane.

To quantify the performance and durability of the membrane thus prepared, the cation transport number in an aqueous 0.5 N sodium chloride solution was measured immediately after the ion-exchange membrane was prepared by the impregnation and after the ion-exchange membrane was stored in distilled water for 2 days, and properties of the ion-exchange membrane prepared according to a condition of plasma surface treatment of the porous substrate membrane are shown in Table 2 below.

TABLE 2

| Classification | Comparative Example 1 | Comparative Example 2 | Example 1 | Example 2 |
|---|---|---|---|---|
| Separation after 2 days of storage in distilled water | Occurred | Occurred | Did not occur | Did not occur |
| Cation transport number immediately after preparation | 0.96 | 0.96 | 0.97 | 0.95 |
| Cation transport number after 2 days of storage in distilled water | 0.65 | 0.63 | 0.95 | 0.95 |

Referring to Table 2, the ion-exchange membranes, which were prepared by impregnating, with a polymer electrolyte, porous substrate membranes whose surface was not treated with plasma (Comparative Example 1) or was treated with plasma using air as a process gas (Comparative Example 2), exhibited the separation between the polymer electrolyte and the porous substrate membrane after stored in distilled water for 2 days. In addition, Comparative Examples 1 and 2 exhibited a cation transport number of 0.96 as measured immediately after the preparation of the ion-exchange membrane and a significantly decreased cation transport number of about 0.65 as measured after 2 days of storage in distilled water, indicating that the ion-exchange membranes of Comparative Examples 1 and 2 have low durability for use as an ion-exchange membrane. On the other hand, the ion-exchange membranes, which were prepared by impregnating, with a polymer electrolyte, porous substrate membranes whose surfaces were treated with plasma using a mixed gas containing oxygen and sulfur dioxide in a specific ratio as a process gas (Examples 1 and 2), exhibited no separation phenomenon even when stored in distilled water for 2 days or more, and since there was almost no variation in cation transport number, the cation transport number was maintained at 0.95 or more.

The foregoing description of the present invention is intended for illustration, and it will be understood by those skilled in the art to which the invention pertains that the invention can be easily modified and implemented in various other forms without changing the technical spirit or essential features of the invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the invention.

The invention claimed is:

1. A method of hydrophilizing a porous membrane, comprising treating a porous membrane with plasma in the presence of a mixed gas containing sulfur dioxide ($SO_2$) at 60 to 80 vol % and oxygen ($O_2$) at 20 to 40 vol %.

2. The method of claim 1, wherein the porous membrane includes two types of polyethylene having different weight-average molecular weights at 30 to 90 wt % and an inorganic filler at 10 to 70 wt %.

3. The method of claim 2, wherein the polyethylene includes a first polyethylene having a weight-average molecular weight of 1,000,000 to 3,000,000 g/mol and a second polyethylene having a weight-average molecular weight of 200,000 to 500,000 g/mol.

4. The method of claim 2, wherein the inorganic filler has an average particle size of 10 to 1,000 nm.

5. The method of claim 2, wherein the inorganic filler includes a hydrocarbon layer formed on a surface thereof.

6. The method of claim 1, wherein the porous membrane has an average pore size of 20 to 2,000 nm.

7. The method of claim 1, wherein the plasma treatment is carried out for 0.5 to 20 minutes.

8. A porous membrane hydrophilized by a method of hydrophilizing a porous membrane, the method comprising treating a porous membrane with plasma in the presence of a mixed gas containing sulfur dioxide ($SO_2$) at 60 to 80 vol % and oxygen ($O_2$) at 20 to 40 vol %, and the porous membrane has a contact angle of 15° or less.

9. A method of preparing an ion-exchange membrane, comprising:
(a) hydrophilizing a porous membrane by treating the porous membrane with plasma in the presence of a mixed gas containing sulfur dioxide ($SO_2$) at 60 to 80 vol % and oxygen ($O_2$) at 20 to 40 vol %;
(b) preparing an electrolytic solution by dissolving a polymer electrolyte in a solvent; and
(c) impregnating the porous membrane hydrophilized in the step (a) with the electrolytic solution.

10. The method of claim 9, wherein the polymer electrolyte is a sulfonated polymer.

11. The method of claim 10, wherein the sulfonated polymer is one sulfonated hydrocarbon-based polymer selected from the group consisting of sulfonated polysulfones, sulfonated polyethersulfones, sulfonated polythiosulfones, sulfonated polyether ether ketones, sulfonated polyimides, sulfonated polystyrenes, sulfonated polyphosphazenes, and a mixture of two or more thereof.

12. The method of claim 10, wherein the sulfonated polymer has a degree of sulfonation of 60 to 90%.

13. The method of claim 9, wherein the electrolytic solution includes the polymer electrolyte at 30 to 60 wt %.

14. The method of claim 9, wherein the solvent is one selected from the group consisting of an ester-based solvent, an ether-based solvent, an alcohol-based solvent, a ketone-based solvent, an amide-based solvent, a sulfone-based solvent, a carbonate-based solvent, an aliphatic hydrocarbon-based solvent, an aromatic hydrocarbon-based solvent, and a mixture of two or more thereof.

* * * * *